US008721001B2

(12) United States Patent
Li et al.

(10) Patent No.: US 8,721,001 B2
(45) Date of Patent: May 13, 2014

(54) HEADREST

(71) Applicant: Suzhou Eagle Electric Vehicle Manufacturing Co., Ltd., Suzhou (CN)

(72) Inventors: Xue Li, Suzhou (CN); Xueqing Zhang, Suzhou (CN)

(73) Assignee: Suzhou Eagle Electric Vehicle Manufacturing Co., Ltd., Suzhou (CN)

( * ) Notice: Subject to any disclaimer, the term of this patent is extended or adjusted under 35 U.S.C. 154(b) by 0 days.

(21) Appl. No.: 13/952,347

(22) Filed: Jul. 26, 2013

(65) Prior Publication Data

US 2013/0320738 A1 Dec. 5, 2013

Related U.S. Application Data

(63) Continuation of application No. PCT/CN2011/001128, filed on Jul. 8, 2011.

(30) Foreign Application Priority Data

Mar. 9, 2011 (CN) .......................... 2011 1 0055417

(51) Int. Cl.
*B60R 21/055* (2006.01)
(52) U.S. Cl.
USPC ........................................ 297/410; 297/397
(58) Field of Classification Search
CPC ............... B60N 2/4879; B60N 2/4808; B60N 2002/022; B62J 1/28
USPC ................................................ 297/410, 391
See application file for complete search history.

(56) References Cited

U.S. PATENT DOCUMENTS

| 3,253,859 | A | * | 5/1966 | Merriman et al. | ............. 297/397 |
| 5,020,855 | A | * | 6/1991 | Lindberg et al. | ............. 297/391 |
| 5,257,853 | A | * | 11/1993 | Elton et al. | .................... 297/391 |
| 6,199,900 | B1 | * | 3/2001 | Zeigler | ......................... 280/735 |
| 6,983,992 | B2 | * | 1/2006 | Oomori | ......................... 297/357 |
| 7,144,083 | B2 | * | 12/2006 | List et al. | ...................... 297/391 |
| 7,578,559 | B2 | * | 8/2009 | Yamane et al. | ............... 297/408 |
| 8,287,040 | B2 | * | 10/2012 | Hojnacki et al. | ......... 297/216.12 |
| 8,657,380 | B2 | * | 2/2014 | Fey et al. | ...................... 297/410 |
| 2009/0021068 | A1 | * | 1/2009 | Yamane et al. | ............... 297/408 |
| 2010/0270841 | A1 | * | 10/2010 | Sobieski et al. | .............. 297/391 |

FOREIGN PATENT DOCUMENTS

| CN | 100526119 C | 8/2009 |
| CN | 101927715 A | 12/2010 |
| CN | 201961422 U | 9/2011 |
| WO | 2010/061714 A1 | 6/2010 |

* cited by examiner

*Primary Examiner* — David E Allred
(74) *Attorney, Agent, or Firm* — Seed IP Law Group PLLC

(57) ABSTRACT

A headrest includes a front casing, a rear casing fixed to the front casing, and a headrest support fixed between the front casing and the rear casing. The headrest support includes a metal plate and a stationary rod. The metal plate is fixed to the top of the stationary rod and clamped between the front casing and the rear casing, and the stationary rod is fixed to the rear casing and extends downward out of the rear casing. The headrest has a certain degree of pressure resistance and softness at the same time, and it retains its original profile after long periods of use.

6 Claims, 4 Drawing Sheets

HEADREST

BACKGROUND

1. Technical Field

The present disclosure relates to an electrical bicycle, and more particularly to a headrest of the electrical bicycle.

2. Description of the Related Art

Conventional electrical bicycles are basically designed and improved referring to the bicycles and the motorcycles. During riding a bicycle or a motorcycle, the driver's head will easily get fatigue because the head is often unable to nestle the bicycle or the motorcycle.

BRIEF SUMMARY

An embodiment of the present application provides a comfortable and reliable headrest.

In an embodiment, a headrest includes a front casing, a rear casing fixed to the front casing and a headrest support fixed between the front casing and the rear casing. The headrest support includes a metal plate and a stationary rod. The metal plate is fixed to a top of the stationary rod and clamped between the front casing and the rear casing. The stationary rod is fixed to the rear casing and extends downwardly beyond the rear casing.

In an embodiment, the stationary rod is a round tube and is of a U-shaped configuration as a whole.

In an embodiment, the front casing includes an outer cortical layer, a plastic piece and a sponge sandwiched between the outer cortical layer and the plastic piece.

In an embodiment, the plastic piece includes a main portion extending backwardly and a peripheral portion enclosing the main portion. The metal piece resists against the main portion.

In an embodiment, the peripheral portion includes a plurality of hooks, the rear casing includes a plurality of fixing holes, and the hooks are lockable with the fixing holes so as to fasten the front casing and the rear casing together.

In an embodiment, the rear casing includes a recessed section and a peripheral section enclosing the recessed section. The recessed section includes an upper embossment and a lower embossment below the upper embossment. The stationary rod includes a horizontal lever abutting against a top side of the upper embossment and a pair of vertical levers extending downwardly from lateral sides of the horizontal lever. The vertical levers clamp opposite sides of the upper embossment.

In an embodiment, the lower embossment includes a pair of first holes, the peripheral section includes a pair of second holes corresponding to the first holes, and the vertical levers extend through the first holes and the second holes in turn and extend beyond the peripheral section.

In an embodiment, each of the upper embossment and the lower embossment includes a restricting hole, the metal piece includes a mounting hole, and the headrest further includes a fixing member for mating with the restricting hole and the mounting hole.

In an embodiment, the headrest includes a support member supporting a bottom side and a rear side of the rear casing. The support member includes a pair of through holes through which the vertical levers extend.

In an embodiment, the headrest further includes a restricting member mounted to the support member. The support member includes a protrusion extending downwardly. The restricting member includes a bottom U-shaped portion surrounding the protrusion and a pair of transverse portions horizontally extending from opposite sides of the U-shaped portion. Each transverse portion includes a sleeve portion received in the through holes. The vertical levers extend through the sleeve portions and extend beyond the support member. The vertical levers are positioned at lateral sides of the U-shaped portion and the protrusion.

In an embodiment, a headrest is provided with a headrest support so as to have a certain degree of pressure resistance and softness at the same time. The headrest retains its original profile after long periods of use.

DETAILED DESCRIPTION

Figure 1:
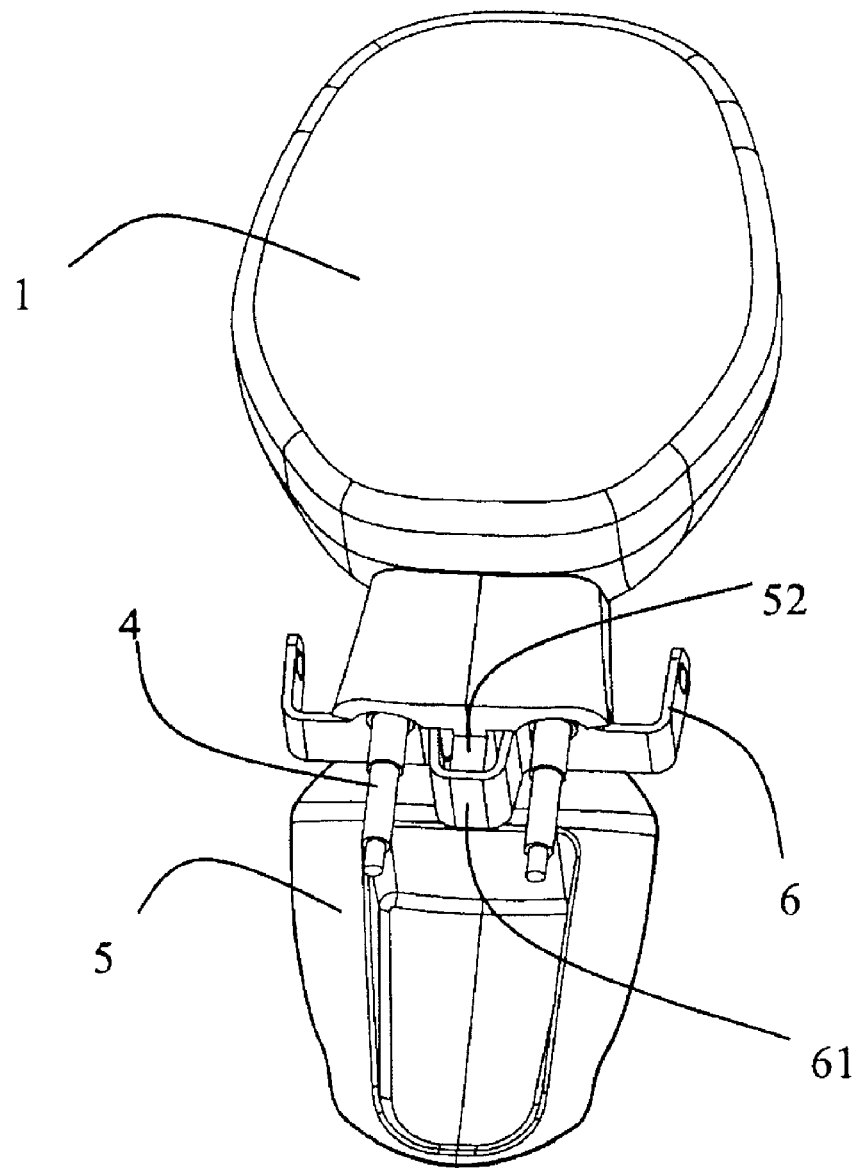
FIG. 1 is a perspective view of a headrest in accordance with an illustrated embodiment.

In order to better understand the present disclosure, a detailed description of example embodiments referring to the drawings will be described hereinafter.

Figure 2:
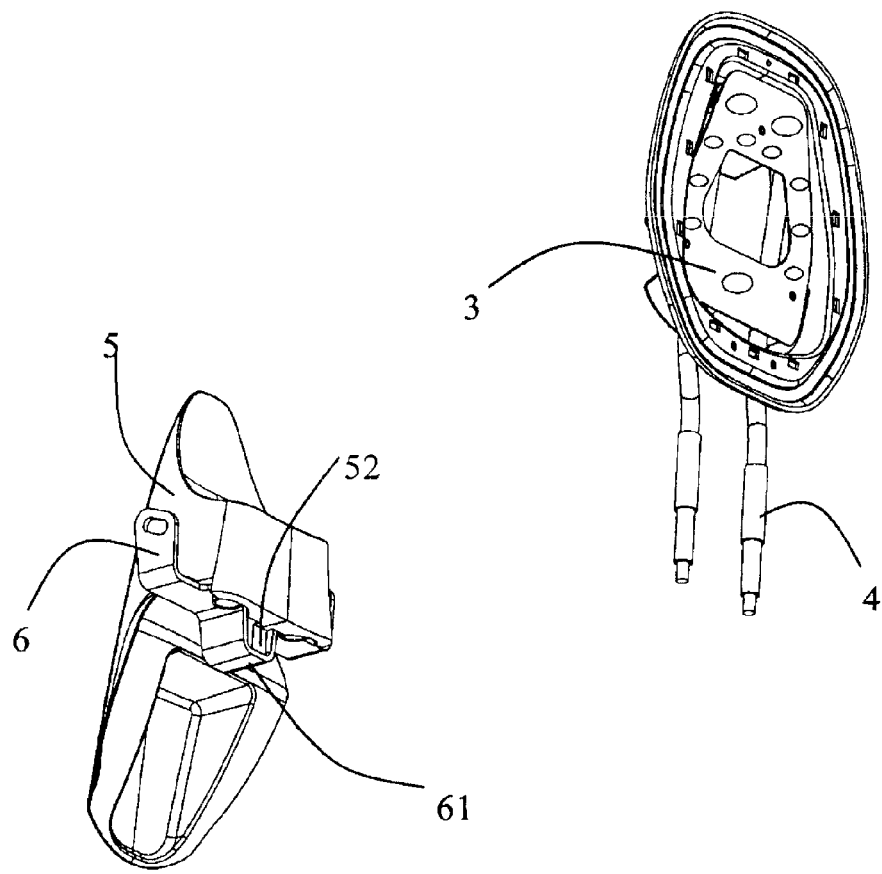
FIG. 2 is a partly exploded view of the headrest in accordance with the illustrated embodiment.
Figure 3:
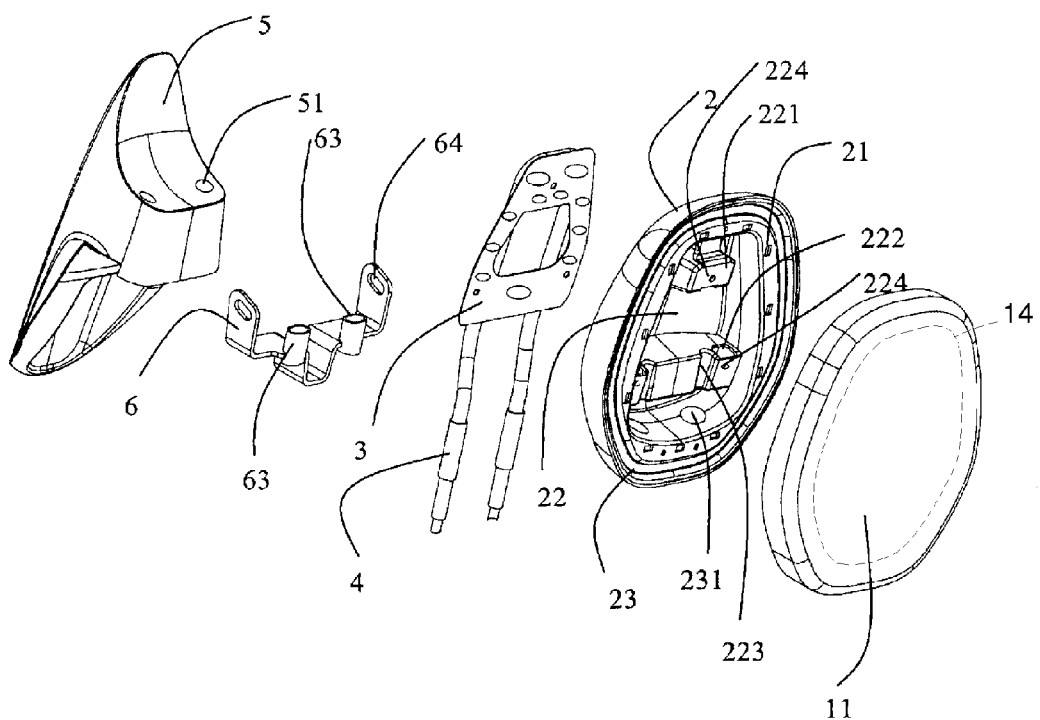
FIG. 3 is an exploded view of the headrest in accordance with the illustrated embodiment.
Figure 4:
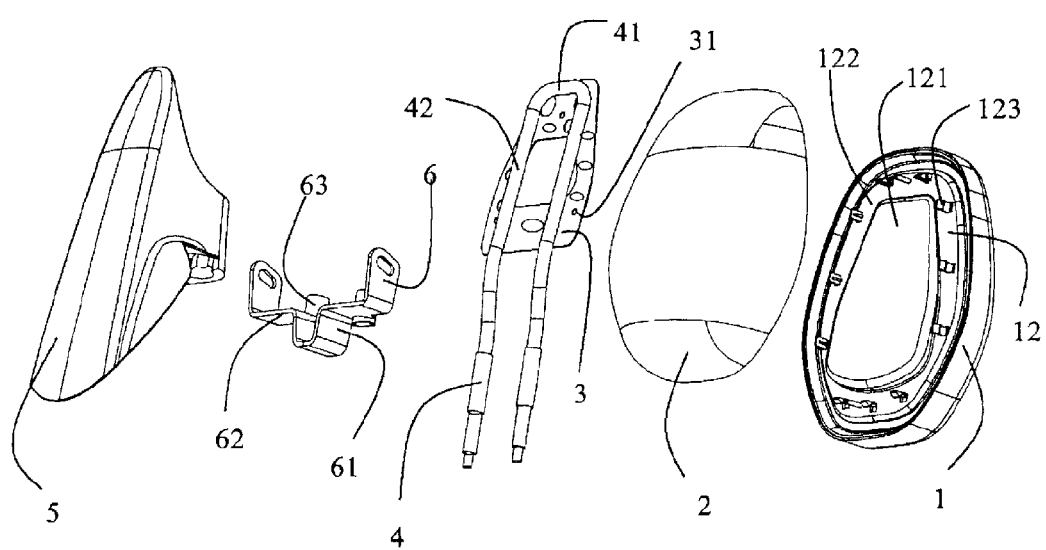
FIG. 4 is another exploded view of the headrest in accordance with the illustrated embodiment.

Referring to FIGS. 1 to 4, the present application discloses a headrest which can be applied to electrical bicycles. The headrest includes a front casing 1, a rear casing 2 fixed to the front casing 1 and a headrest support fixed between the front casing 1 and the rear casing 2 to facilitate reliably keeping the contour of the headrest. The headrest support includes a metal plate 3 and a stationary rod 4. The metal plate 3 is fixed to a top of the stationary rod 4 and clamped between the front casing 1 and the rear casing 2. The stationary rod 4 is fixed to the rear casing 2 and extends downwardly beyond the rear casing 2. The stationary rod 4 is a round tube and is of a U-shaped configuration as a whole.

The front casing 1 includes an outer cortical layer 11, a plastic piece 12 and a sponge 14 sandwiched between the outer cortical layer 11 and the plastic piece 12. The front casing 1 has security protection function. That is to say, when the human head backwardly collides the front casing 1, since the front casing 1 is soft, it can be provided with excellent buffering protection of the head so as to facilitate avoiding accident injury.

The plastic piece 12 includes a main portion 121 extending backwardly and a peripheral portion 122 enclosing the main portion 121. The metal piece 3 resists against the main portion 121. The peripheral portion 122 includes a plurality of hooks 123, the rear casing 2 includes a plurality of fixing holes 21, and the hooks 123 are lockable with the fixing holes 21 so as to fasten the front casing 1 and the rear casing 2 together.

The rear casing 2 includes a recessed section 22 and a peripheral section 23 enclosing the recessed section 22. The recessed section 22 includes an upper embossment 221 and a lower embossment 222 below the upper embossment 221. The stationary rod 4 includes a horizontal lever 41 abutting against a top side of the upper embossment 221 and a pair of vertical levers 42 extending downwardly from lateral sides of the horizontal lever 41. The vertical levers 42 clamp opposite sides of the upper embossment 221.

The lower embossment 222 includes a pair of first holes 223, the peripheral section 23 includes a pair of second holes 231 corresponding to the first holes 223, and the vertical levers 42 extend through the first holes 223 and the second holes 231 in turn and further extend beyond the peripheral section 23.

Each of the upper embossment 221 and the lower embossment 222 includes a restricting hole 224, and the metal piece 3 includes a mounting hole 31 corresponding to the restricting hole 224. The headrest further includes a fixing member for mating with the restricting hole 224 and the mounting hole 31. The fixing member can be a screw.

The headrest includes a support member 5 supporting a bottom side and a rear side of the rear casing 2. The support member 5 includes a pair of through holes 51 through which the vertical levers 42 extend downwardly.

The headrest further includes a restricting member 6 mounted to the support member 5. The support member 5 includes a protrusion 52 extending downwardly. The restricting member 6 includes a bottom U-shaped portion 61 and a pair of transverse portions 62 horizontally extending from opposite sides of the U-shaped portion 61. Each transverse portion 62 includes a sleeve portion 63. The U-shaped portion 61 surrounds a bottom side and opposite lateral sides of the protrusion 52. The sleeve portions 63 are received in the through holes 51. The vertical levers 42 extend through the sleeve portions 63 and extend beyond the support member 5. The vertical levers 42 are positioned at lateral sides of the U-shaped portion 61 and the protrusion 52. The restricting member 6 further includes a pair of vertical pieces 64 extending upwardly from opposite ends of the transverse portions 62 for fixing with other components of the electrical bicycle. The restricting member 6 is mainly used for downwardly resisting against the vehicle framework for preventing that the headrest offsets from the normal position because of the downward movement of the headrest.

In conclusion, the description of the above embodiment is only used for the understanding of the present application. It should be noted that, those skilled in the art may make many improvements and modifications to the present application without departing from the principle of the present application, and these improvements and modifications also fall into the protection scope of the claims of the present application.

What is claimed is:

1. A headrest comprising:
a front casing;
a rear casing fixed to the front casing;
a headrest support fixed between the front casing and the rear casing, the headrest support comprising a metal plate and a stationary rod, the metal plate being fixed to a top of the stationary rod and clamped between the front casing and the rear casing, the stationary rod being fixed to the rear casing and extending downwardly beyond the rear casing;
a support member supporting a bottom side and a rear side of the rear casing; and
a restricting member mounted to the support member,
wherein the rear casing comprises a recessed section and a peripheral section enclosing the recessed section, the recessed section comprising an upper embossment and a lower embossment below the upper embossment, the stationary rod comprising a horizontal lever abutting against a top side of the upper embossment and a pair of vertical levers extending downwardly from lateral sides of the horizontal lever, the vertical levers clamping opposite sides of the upper embossment,
wherein the lower embossment comprises a pair of first holes, the peripheral section comprises a pair of second holes corresponding to the first holes, and the vertical levers extend through the first holes and the second holes in turn and extend beyond the peripheral section, and
wherein the support member comprises a pair of through holes through which the vertical levers extend and a protrusion extending downwardly, the restricting member comprises a bottom U-shaped portion surrounding the protrusion and a pair of transverse portions horizontally extending from opposite sides of the U-shaped portion, each transverse portion comprising a sleeve portion received in the through holes, the vertical levers extend through the sleeve portions and extend beyond the support member, and the vertical levers are positioned at lateral sides of the U-shaped portion and the protrusion.

2. The headrest as claimed in claim 1, wherein the stationary rod is a round tube and is of a U-shaped configuration as a whole.

3. The headrest as claimed in claim 1, wherein the front casing comprises an outer cortical layer, a plastic piece and a sponge sandwiched between the outer cortical layer and the plastic piece.

4. The headrest as claimed in claim 3, wherein the plastic piece comprises a main portion extending backwardly and a peripheral portion enclosing the main portion, the metal piece resting against the main portion.

5. The headrest as claimed in claim 4, wherein the peripheral portion comprises a plurality of hooks, the rear casing comprises a plurality of fixing holes, and the hooks are lockable with the fixing holes so as to fasten the front casing and the rear casing together.

6. The headrest as claimed in claim 1, wherein each of the upper embossment and the lower embossment comprises a restricting hole, the metal piece comprises a mounting hole, and the headrest further comprises a fixing member for mating with the restricting hole and the mounting hole.

* * * * *